United States Patent [19]

Rashev

[11] Patent Number: 4,551,620

[45] Date of Patent: Nov. 5, 1985

[54] BIORHYTHMS ANALOG COMPUTER-CALENDAR

[76] Inventor: Michael Rashev, 40 W. 72nd St., Apt. 31B, New York, N.Y. 10023

[21] Appl. No.: 393,398

[22] Filed: Jun. 29, 1982

[51] Int. Cl.⁴ ........................ G04B 19/21; G06C 3/00; G09D 3/00; G01D 13/08

[52] U.S. Cl. .................................. 235/1 C; 235/1 D; 235/61 B; 235/61 A; 235/72; 235/73; 235/76; 235/87 R; 235/109; 235/110; 235/85 FC; 235/88 RC; 40/107; 40/111; 40/114; 116/309; 116/337; 116/299

[58] Field of Search .................... 235/1 C, 1 D, 61 B, 235/61 A, 72, 73, 76, 78 RC, 85 FC, 88 RC, 87 R, 109, 110, 70 A; 116/307, 309, 337, 299; 40/107, 111-114

[56] References Cited

U.S. PATENT DOCUMENTS 4,211,025 7/1980 Metz ................................ 40/107 X
4,240,153 12/1980 Merritt ....................... 235/85 FC X

FOREIGN PATENT DOCUMENTS 339758 9/1959 France ............................. 235/70 A

*Primary Examiner*—Richard A. Wintercorn
*Assistant Examiner*—Della J. Rutledge

[57] ABSTRACT

A Biorythms analog computer-calendar is provided to display without computations the level of the physical, the emotional, and the intellectual biorythms of a human body. The level of the three biorythms appears on display in analog and digital forms for any dialed calendar date, if the computer-calendar is set initially with the individual's birth date. The analog elements used to register the three biorythm levels are drums attached to gears with a number of teeth equal or proportional to 23, 28 and 33, or to the period of the three biorythms respectively. A calendar arrangement is introduced to create a correlation between the displayed biorythm levels and the calendar date associated with them.

7 Claims, 1 Drawing Figure

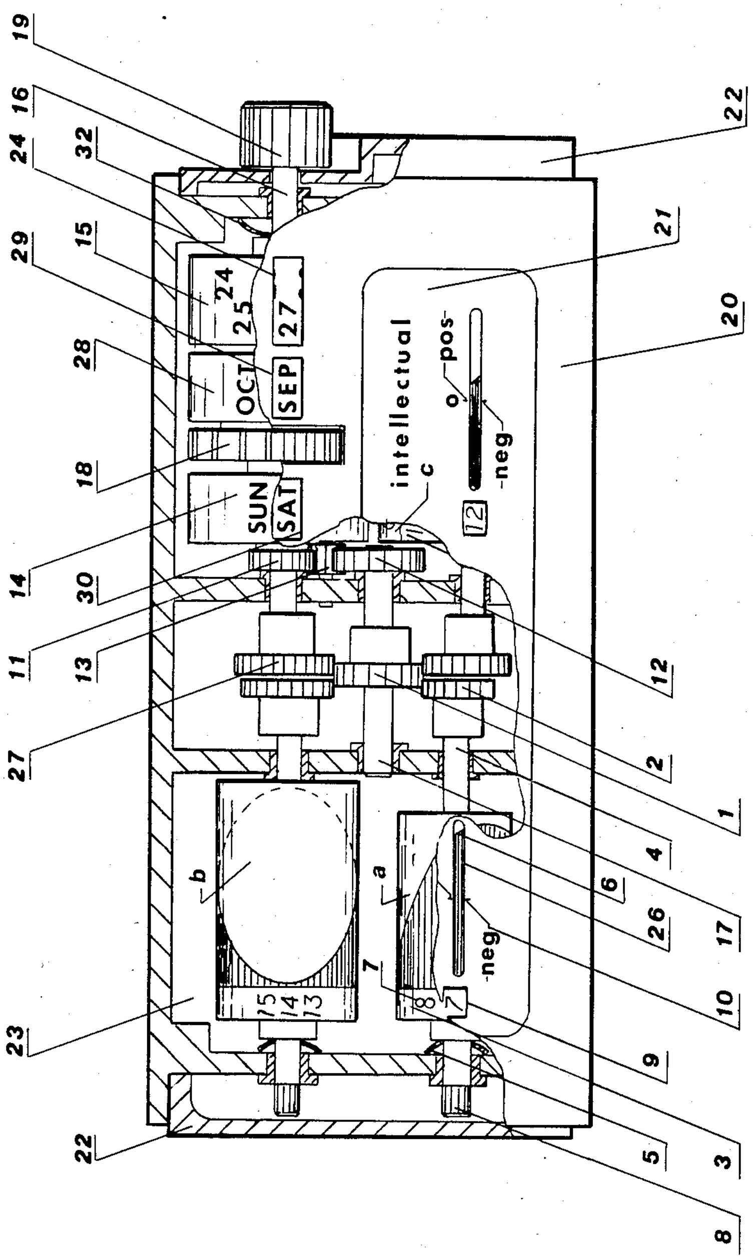
intellectual
pos
neg
OCT
SEP
SUN
SAT

BIORHYTHMS ANALOG COMPUTER-CALENDAR

SUMMARY OF THE INVENTION

This invention relates to a new and useful improvement in Biorythm computer devices.

An object of the invention is to provide a personal biorythms analog computer-calendar for everyday use, displaying the three biorythm states and the dialed calendar date, without a necessity of dialing every day the individual's birth date and providing computations.

Another object of the invention is to memorize the displayed levels of the three biorythms, and the calendar date associated with those levels, for an unlimited amount of time, without using less reliable elements, such as electronic components and batteries.

Yet another object is to provide an easy reading of the displayed data for both "digital" and "visual" type of people, due to its hybrid nature, e.g. the displayed data appears in its digital and analog forms.

The computer uses the existing analogy between the period of the biorythms of the human body and the period of motion of some cyclic elements. Changing in 1/23, 1/28 and 1/33 of their states or lengths is equivalent in changes of 1/23, 1/28 and 1/33 of each respective biorythm level.

An embodiment is disclosed to illustrate the principles of the invention. Its important feature is that the displayed amplitude of the three cycles can be extended without affecting substantially the overall dimensions of the computer.

Other objectives and aspects of the invention will become apparent from the detailed description of specific exemplary embodiment of principles of the invention.

BRIEF DESCRIPTION OF THE DRAWING

The above described and other objects and advantages of the invention are hereinafter described in greater detail and claimed, reference being had to the accompaning drawings forming a part hereof, wherein like numerals refer to like parts throughout, and in which the shown FIG. 1 is a simplified plan view, partly cut away, of an exemplary embodiment.

DETAILED DESCRIPTION

Referring now in more detail to the drawing all details of the exemplary embodiment are enclosed in a housing, which comprises a front cover 20 with a display panel 21, a rear cover 23 and two side covers 22, attached to the main housing. The display panel 21 comprises slots 26 and windows 9, to the left of slots 26.

The invention comprises three biorythm groups: physical, emotional and intellectual. During further description, they are considered as groups "a", "b" and "c" respectively. The three groups consist of same elements, but are different in size. Biorythm group "a" is formed of gears 2, having numbers of teeth equal or proportional to 23 Each gear 2 and its respective drum 3 are affixed to a respective shaft 4, which can rotate about its axis of symmetry.

Gear 2 synchronizes the motion of drum 3 by being engaged to a central gear 1, which is affixed to and rotate together about a central shaft 17. The central gear 1 can be single, as it is shown in the figure, or double (two identical gears, separated and attached to the central shaft 17). Each shaft 4 is provided to slide along its rotational axis until gear 2 disengage from the central gear 1, and after turning to reengage in other angular position to gear 2. Spring 5 is disposed along the shaft 4, so as to keep a permanent engagement between gear 2 and the synchronizing central gear 1.

Each drum 3 comprises a biorythm graph 6, with an elliptical shape, which is disposed around the periphery of the drum. The graph 6 can be considered as an outline of the cross section of drum 3 with a plane not perpendicular to the axis of rotation of the same drum. Also there is a numbers column 7 around the periphery of each drum 3 disposed to the left of each graph 6, showing the correlation between the level of each biorythm and the number of the elapsed days since beginning of the same biorythm. The drum 3 is located behind the display panel 21 in such arrangement that part of the graph 6 appears on display through a respective slot 26. During rotation of drum 3, the right hand side edge 31 of the elliptical graph 6 projects different portions along the slot 26, representing the sinusoidal pattern of biorythms. Similarly, the correlated number from the numbers column 7 appears on window 9. The central gear 1 is engaged to an actuating gear 27. Gear 27 is permanently attached to the left end of an actuating shaft 16, whose right end comprises permanently affixed actuating knob 19.

A days-of-the-month drum 15 is attached to the actuating shaft 16, so as to rotate together with the actuating gear 27 and the actuating knob 19. A months-of-the-year drum 28 is mounted next to drum 15 to rotate free about the actuating shaft 16, and is attached to a dialing months-of-the-year knob 18. A days-of-the-week drum 14 is disposed on shaft 16, next to knob 18. It rotates free about the actuating shaft 16, and is affixed to a first days-of-the-week gear 11. Gear 11 is permanently engaged to an idle gear 13, which is also engaged to a second days-of-the-week gear 12 affixed to the central shaft 17. In such arrangement, the days-of-the-week drum 14 follows the angular position of the central gear 1. The day-of-the-week drum 14, the months-of-the-year drum 28 and the day-of-the-month drum 15 have on their periphery columns with letters or numbers showing the days of the week, the months of the year and the days of the month, respectively, and constitute the calendar group of the computer-calendar.

The front housing 20 or the front panel 21 comprises, in front of each calendar drum, a calendar days-of-the-week window 30, a calendar months-of-the-year window 29 and a calendar days-of-the-month window 24, so as to display through them the dialed day of the week, month of the year and day of the month, respectively. An engaging spring 32 is affixed to the right end of the actuating shaft 16, so as to keep actuating gear 27 in permanent engagement with central gear 1.

The personal biorythms analog computer-calender works as follows: any calendar date dialed by knob 19 and knob 18, appears on windows 30, 29 and 24 in sequence: day of the week, month of the year, and day of the month. In the same time, the knob 19 actuates the actuating gear 27, by means of shaft 16, and also the central gear 1. The central gear 1, single or double, turns all three groups: the emotional (a), the physical (b) and the intellectual (c) on an angle determined by the dialed calendar date. During rotation of respective groups "a", "b", and "c", the right hand side edge 31 of each biorhythm graph 6, projects a sinusoidal motion through the respective slot 26. The position of graph 6 shown through slot 26 is proportional to the level of the three biorhythms. The position of each moving edge 31 shows positive level of each biorhythm, if the displayed portion of edge 31 is disposed to the right of the middle of each slot. Similarly, each biorhythm has a negative level, if the displayed portion of the moving edge 31 is disposed to the left of the middle of each slot. A visual display graph 10 on panel 21, located around each slot, show the above mentioned and help the individual in proper reading. The "digital" display of the computer or the display, shown through window 9, is to the left of the "analog" display or to the left of each slot 26. Its main function is at the beginning of use, when the computer has to be set with the individual's birthday.

This is done by pushing in or pulling out the ends of each shaft 8, (depending whether a single or double central gear 1 is used), and turning them until the computed by other means elapsed days since beginning of each biorhythm, appear through window 9. After that the shafts 8 have to be released to allow gear 2 reengage in its new angular position.

During current use, the "digital" display through window 9 shows the number of days elapsed since the beginning of each cycle and can serve as an additional feedback to the individual using the computer.

The foregoing embodiment illustrates principles of the invention, but it should be clear that numerous modifications and changes will readily occur to those skilled in the art based on the disclosure of this application, and that the invention is not limited to the exact construction and operation disclosed in detail but encompasses suitable modifications and equivalents utilizing the invented principles and falling within the scope of the invention.

What is claimed is:

1. A biorythms multicycle analog computer-calendar displaying the level of the biorythms of the human body, comprising:

a housing having at least one display window arranged to indicate at least one cycle of the human biorythms;

three rotationally symmetrical bodies having driving means to rotate within said housing with fixed axes of rotation, each body comprising on its surface a closed loop curve to enclose said fixed axis of rotation;

a calendar date arrangement to correllate in time the angular position of said rotationally symmetrical bodies;

an actuating means to actuate in parallel the angular position of said bodies and said calendar date arrangement;

a synchronizing means to synchronize the angular position of said rotationally symmetrical bodies and said calendar date arrangement;

wherein each closed loop curve disposed on the surface of each body during its rotation projects through said at least one display window different parts of said curve, thus to constitute in time a sinusoidal-like mode of alteration of one of the biorythms of the human body and to correlate it to a given calendar time by means of said calendar date arrangement.

2. A biorythms analog computer-calendar as defined in claim 1, wherein:

said three rotationally symmetrical bodies are three drums, first, second and third respectively;

said driving means are gears, first gear comprising number of teeth proportional to 23 and attached to the said first drum to provide an actuation for the physical biorythm display; second gear comprising number of teeth proportional to 28 and attached to the said second drum to provide an actuation for the emotional biorythm display; and third gear comprising number of teeth proportional to 33, to provide an actuation for the intellectual biorythm display, respectively;

said closed loop curve disposed on the surface of each drum is an elipse which may be formed, also, as an outline of the cross section of each drum with a plane not perpendicular to the axis of rotation of each drum.

3. A biorythms analog computer-calendar as defined in claim 1, wherein said housing comprises three windows, each window having the shape of a substantially linear slot parallel to the axis of rotation of each drum, whose elipse curve projects through said slot, during rotation of said drum, a sinusoidal biorythm-time-related mode.

4. A biorythms analog computer-calendar as defined in claim 3, wherein:

said synchronizing means is at least one gear to synchronize the angular position of said three drums and said calendar date arrangement;

each of said gears and said drums can slide along their axes of rotation, the disengage and reengage in a new angular position, so as to set the angular position of each drum according to the user's birthdate.

5. A biorythm analog computer-calendar according to claim 1, wherein said calendar date arrangement comprises: a days-of-the-week cylinder having designated the days of the week on its surface, as the position of said cylinder is synchronized with the position of said three bodies by means of said synchronizing means, and additional gear means;

a days-of-the-month cylinder having the days-of-the-month designation on its surface, as the position of said cylinder is synchronized with the position of said three bodies by means of said synchronizing means and an actuating gear connected to said cylinder by means of an actuating shaft.

6. A biorythms analog computer-calendar as defined in claim 5, comprising:

a months-of-the-year cylinder having a designation with the months-of-the-year on its surface.

7. A biorythms analog computer-calendar as defined in claim 3, wherein:

each drum comprises numbers from 1 to 23, from 1 to 28 and from 1 to 33 to designate the number of elapsed days since the beginning of the physical, the emotional and the intellectual biorythm cycles, respectively; said numbers to be used to set the computer with the user's birthdate and to provide, in addition, during use, a digital feedback, which is provided for display through respective windows in said housing.

* * * * *